United States Patent [19]

Hayden

[11] 4,143,192
[45] Mar. 6, 1979

[54] TAPE STRIP

[75] Inventor: William L. Hayden, Dearborn Heights, Mich.

[73] Assignee: Ford Motor Company, Dearborn, Mich.

[21] Appl. No.: 851,315

[22] Filed: Nov. 14, 1977

[51] Int. Cl.² .................. B60R 13/00; B32B 7/00; C09J 7/02
[52] U.S. Cl. ........................... 428/31; 428/40; 428/261; 428/343; 293/1
[58] Field of Search ............. 428/31, 261, 262, 264, 428/343, 40; 427/207 R, 207 B; 293/1, 62; 296/41

[56] References Cited
U.S. PATENT DOCUMENTS 2,049,030  7/1936  Strauss ........................... 428/43
3,843,475  10/1974 Kent ............................. 293/1 X
3,862,634  1/1975  Small ............................ 428/40 X
3,970,498  7/1976  Loew ............................ 428/31 X
4,010,297  3/1977  Wenrick ......................... 428/31

Primary Examiner—George F. Lesmes
Assistant Examiner—Daniel R. Zirker
Attorney, Agent, or Firm—William E. Johnson; Keith L. Zerschling

[57] ABSTRACT

A tape strip is disclosed. This strip has an elongated strip portion having an outer face and an inner face with adhesive thereon. The elongated strip portion has a width not exceeding three-eighths of an inch. A pair of tape end portions are provided one at each end of the elongated strip portion. The pair of tape end portions have an outer face and an inner face with adhesive thereon. The tape end portions have a width dimension of at least one-half inch.

8 Claims, 6 Drawing Figures

4,143,192

TAPE STRIP

BACKGROUND OF THE INVENTION

Tape strips are used as ornamental decorations on articles such as motor vehicles. Sometimes the tape strips provide an accent color to the main color on the vehicle. In other cases, they provide a zone of separation between two different colors.

I have found that when tape strips of generally narrow dimension, namely three-eighths of an inch, and principally one-eighth inch width or less, are used as a decorative strip, they are subject to unraveling at their ends. The unraveling occurs because the width dimension of the tape strip does not permit sufficient pressure to be applied to the adhesive on the inner face of the tape strip to cause a secure bonding of that strip to the article to which it is applied. This is particularly true in automotive applications where the ends of the tape strips are generally folded over and hidden behind some metal surface. Application of the tape strip requires the applying person to fold the strip behind the surface and then apply a pressure thereto.

A prior art search was conducted on the tape strip of this invention. The only patent cited in that report was U.S. Pat. No. 2,049,030 for an Adhesive Wrapping Strip. This patent discloses an adhesive wrapping strip where the adhesive was not equally applied to the entire length of the strip, but merely at the end portions thereof where the strip was to be divided.

SUMMARY OF THE INVENTION

This invention relates to a tape strip and, more particularly, to a tape strip which may be used for a decorative function if so desired.

In accordance with the teachings of this invention, a tape strip is formed so as to have at least one elongated strip portion having an outer face and an inner face, which inner face has an adhesive material thereon. The elongated strip portion has a width not exceeding three-eighths of an inch. A pair of tape end portions are located one at each end of the elongated strip portion. The pair of tape end portions have an outer face and an inner face which has an adhesive material thereon. The tape end portions have a width dimension of at least one-half inch or more. The larger dimension of the pair of tape end portions permits these portions to be securely bonded to an article when pressure is applied to the pair of tape end portions. The greater bonding strength insures that the tape strip will not unravel from the location where it has been placed.

In accordance with other embodiments of this invention, the pair of end portions may be circles having a diameter equal to or greater than one-half inch. In accordance with another embodiment, the pair of end portions may be rectangles having length and width dimensions equal to or greater than one-half inch.

In accordance with still further embodiments of this invention, the tape strip may have a plurality of elongated strip portions with each individual strip portion having a width not exceeding three-eighths of an inch. In such a case, a pair of tape end portions are used one at each end of adjacent ones of the plurality of elongated strip portions.

DESCRIPTION OF THE PREFERRED EMBODIMENT

Figure 1:
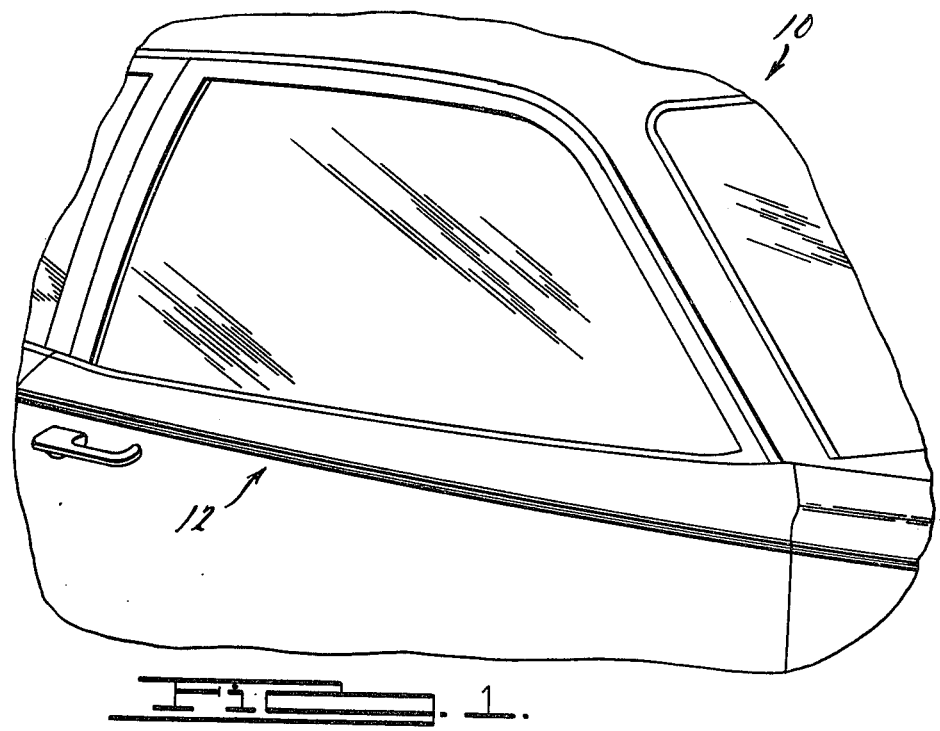
FIG. 1 is a pictorial illustration of an automobile having a pair of tape strips applied thereto.

In FIG. 1 there is seen a portion of an automobile generally designated by the numeral 10. A pair of tape strips generally designated by the numeral 12 are shown running along the belt line of the automobile. The purpose of the tape strips is to add a decorative accent to the automobile. For example, the tape strips may be of a color which contrasts with the body color painted on the automobile thereby emphasizing the styling characteristics at the belt line. These tape strips are formed of any suitable material well known in the art which has an adhesive on the inner face thereof. When applied to the vehicle, the adhesive bonds the strips to the surface of the vehicle.

Figure 2:
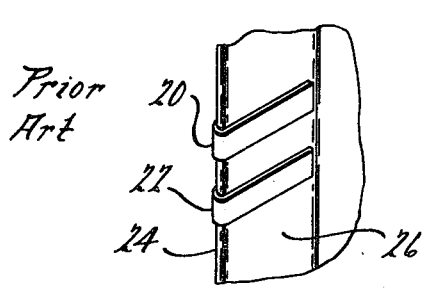
FIG. 2 is a pictorial illustration of the tape strips of the prior art.

In FIG. 2, individual tape strips 20 and 22 are shown. These individual strips have a width of less than three-eighths of an inch. As shown in FIG. 2, the tape strips are folded around an edge 24 of a body member 26 and terminated. The tape strips 20 and 22 have the same relative width both on the front side and on the terminal side of the body member 26. Because this width is less than three-eighths of an inch, an operator applying the same to the body member 26 at the terminal portion thereof does not generally apply sufficient force to obtain a secure bonding thereof. Since these strips are not fully bonded, they have a tendency to unravel and come loose from the body member 26.

Figure 3:
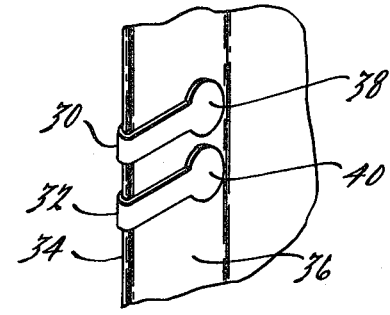
FIGS. 3, 4, 5 and 6 are pictorial illustrations of tape strips in accordance with various embodiments of this invention.

In accordance with the teachings of my invention, as is best seen in FIG. 3, elongated tape strips 30 and 32 are wrapped around edge 34 of body member 36. Each of the elongated strips 30 and 32 terminate in a tape end portion 38 and 40, respectively. The other ends of the elongated strip portions 30 and 32 also terminate in such end portions. In general, the end portions 38 and 40 have a width dimension of at least one-half inch or more. In this case, the end portions are circular in shape and have a diameter of one-half inch or more. These enlarged tape end portions permit the operator to apply pressure on the adhesive contained on the inner faces thereof to insure that a greater bond is formed. In such a manner, the elongated strip portions 30 and 32 will have less of a tendency to unravel than the prior art strips.

Figures 4, 5, 6:
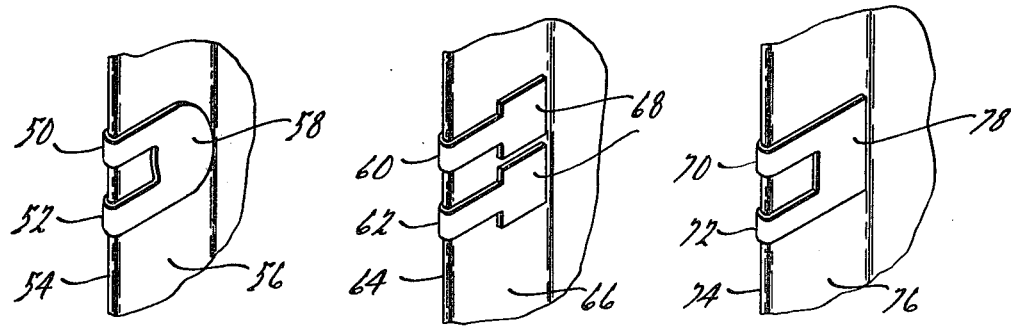

FIG. 4 shows elongated strip portions 50 and 52 being turned over edge 54 of body member 56 and terminating in a single large tape end portion 58. A similar single large tape portion would be provided at the other end of the elongated strip portions 50 and 52. In this case, the individual elongated strip portions have a width not exceeding three-eighths of an inch. The diameter of the circular tape end portion 58 would be sufficient in this case to provide a space between the two elongated strips, as is illustrated in FIG. 4.

In FIG. 5 a pair of elongated strip portions 60 and 62 are shown as folded over edge 64 of body member 66. In this case, each of the elongated strip portions is terminated by a tape end portion 68. In this case, the tape end portions 68—68 are rectangular in configuration with each dimension being at least one-half inch or more. Again, the enlarged termination area provides a greater amount of area over which pressure may be applied in order to insure that the terminal ends of the elongated strip portions are firmly bonded to the body member so that they will not unravel.

FIG. 6 shows elongated strip portions 70 and 72 folded over edge 74 of body member 76. In this case, both of the elongated strip portions are terminated by a single large rectangular tape end portion 78. Once again, this portion has length and width dimensions one-half inch or more and sufficient to separate the two elongated strip portions from one another. This portion also provides sufficient area to permit secure bonding thereof to the body member.

There has been disclosed herein a tape strip. In view of this specification, those skilled in the art will be able to make many modifications thereof. It is intended that all such modifications be included within the scope of the appended claims.

What I claim is:

1. A tape strip comprising:
   an elongated strip portion having an outer face and an inner face, said elongated strip portion having a width not exceeding three-eighths of an inch;
   an adhesive layer on said inner face of said elongated strip portion;
   a pair of tape end portions, one portion being attached at each end of said elongated strip portion, said pair of tape end portions having an outer face and an inner face, said tape end portion having a width dimension of at least one-half inch; and
   an adhesive layer on said inner face of each of said tape end portions.

2. The tape strip of claim 1 wherein said pair of end portions are circles having a diameter of at least one-half inch.

3. The tape strip of claim 1 wherein said pair of end portions are rectangles having length and width dimensions of at least one-half inch.

4. The tape strip of claim 1 wherein said elongated strip portion has a width not exceeding one-eighth inch.

5. A tape strip comprising:
   a plurality of elongated strip portions each having an outer face and an inner face, each of said elongated strip portions having a width not exceeding three-eighths of an inch,
   an adhesive layer on said inner face of each of said plurality of elongated strip portions;
   a pair of tape end portions, each tape end portion being attached at opposite ends of said elongated strip portion to an adjacent end of said elongated strip portion, said pair of tape end portions having an outer surface and an inner surface, said tape end portions having a width dimension of at least one-half inch; and
   an adhesive layer on said inner surface of each of said tape end portions.

6. The tape strip of claim 5 wherein said pair of end portions are circles having a diameter of at least one-half inch.

7. The tape strip of claim 5 wherein said pair of end portions are rectangles having length and width dimensions of at least one-half inch.

8. The tape strip of claim 5 wherein said elongated strip portions have a width not exceeding one-eighth of an inch.

* * * * *